(12) United States Patent
Kim et al.

(10) Patent No.: US 9,063,379 B2
(45) Date of Patent: Jun. 23, 2015

(54) DISPLAY PANEL AND METHOD OF MANUFACTURING THE SAME

(71) Applicant: SAMSUNG DISPLAY CO., LTD., Yongin, Gyeonggi-Do (KR)

(72) Inventors: Swae-Hyun Kim, Asan-si (KR); Je Hyeong Park, Hwaseong-si (KR); YoungGoo Song, Asan-si (KR); Kipyo Hong, Suwon-si (KR); Sunghee Hong, Hwaseong-si (KR); Sang Woo Whangbo, Seoul (KR)

(73) Assignee: Samsung Display Co., Ltd. (KR)

( * ) Notice: Subject to any disclaimer, the term of this patent is extended or adjusted under 35 U.S.C. 154(b) by 124 days.

(21) Appl. No.: 13/842,590

(22) Filed: Mar. 15, 2013

(65) Prior Publication Data

US 2014/0132901 A1   May 15, 2014

(30) Foreign Application Priority Data

Nov. 14, 2012   (KR) .......................... 10-2012-0129039

(51) Int. Cl.
*G02F 1/1337*   (2006.01)

(52) U.S. Cl.
CPC ................. *G02F 1/133753* (2013.01)

(58) Field of Classification Search
USPC ........................................................ 349/123
See application file for complete search history.

(56) References Cited

U.S. PATENT DOCUMENTS

| 7,639,334 B2 * | 12/2009 | Iwato et al. ................. 349/138 |
| 2002/0131008 A1 | 9/2002 | Iwase et al. |
| 2004/0100611 A1 | 5/2004 | Song |
| 2008/0002136 A1 | 1/2008 | Lee |
| 2008/0064221 A1 | 3/2008 | Han et al. |
| 2010/0330792 A1 | 12/2010 | Kim |
| 2011/0193769 A1 | 8/2011 | Ohgami et al. |
| 2011/0242468 A1 | 10/2011 | Choi et al. |
| 2012/0033162 A1 | 2/2012 | Ahn |

FOREIGN PATENT DOCUMENTS

| KR | 10-2001-0047487 A | 6/2001 |
| KR | 10-2002-0010974 A | 2/2002 |
| KR | 10-2002-0076847 A | 10/2002 |
| KR | 10-2004-0034899 A | 4/2004 |
| KR | 10-2008-0003075 A | 1/2008 |
| KR | 10-2009-0045742 A | 5/2009 |
| KR | 10-2012-0124012 A | 11/2012 |

* cited by examiner

*Primary Examiner* — James Dudek
(74) *Attorney, Agent, or Firm* — Innovation Counsel LLP

(57) ABSTRACT

A display panel includes a first substrate, a second substrate, and a liquid crystal layer disposed between the first and second substrates. The first substrate includes a recess portion recessed into the first substrate from the surface of a common electrode and a first alignment barrier protruded from the recess portion in an area corresponding to at least a portion of an end portion of a first alignment layer.

17 Claims, 14 Drawing Sheets

DISPLAY PANEL AND METHOD OF MANUFACTURING THE SAME

CROSS-REFERENCE TO RELATED APPLICATION

This U.S. non-provisional patent application claims priority under 35 U.S.C. §119 to Korean Patent Application No. 10-2012-0129039, filed on Nov. 14, 2012, the contents of which are hereby incorporated by reference in their entirety.

BACKGROUND

1. Field of Disclosure

The present disclosure relates to a display panel and a method of manufacturing the same. More particularly, the present disclosure relates to a liquid crystal display panel capable of improving the display quality, and a method of manufacturing the liquid crystal display panel.

2. Description of the Related Art

In general, liquid crystal display panels include two transparent substrates and a liquid crystal layer disposed between the two substrates. Electrodes on the substrates drive the liquid crystal molecules of the liquid crystal layer to control a transmittance of light in each pixel, thereby displaying a desired image.

The liquid crystal display panel includes an alignment layer to initially align the liquid crystal molecules of the liquid crystal layer. The alignment layer is provided on a surface of each substrate. When the alignment layer is overcoated or not coated enough on the surface of the substrates, the two substrates are not appropriately adhered to each other, or stains occur on images.

SUMMARY

The present disclosure provides a display panel capable of preventing defects from occurring due to an alignment.

The present disclosure provides a method of manufacturing the display panel.

In one aspect, a display panel is provided, including a first substrate that includes a first base substrate, a common electrode disposed on the first base substrate, and a first alignment layer disposed on the common electrode; a second substrate that includes a second base substrate, a pixel electrode disposed on the second base substrate, and a second alignment layer disposed on the pixel electrode; and a liquid crystal layer disposed between the first substrate and the second substrate, wherein the first substrate includes a recess portion recessed into the first substrate from a surface of the common electrode, and a first alignment barrier protruded from the recess portion in an area of the first substrate corresponding to a position of at least a portion of an end portion of the first alignment layer.

The first alignment layer barrier may include a first barrier spaced apart from the first alignment layer and a second barrier overlapped with the first alignment layer, and the end portion of the first alignment layer is interposed between the first barrier and the second barrier.

An upper surface of the first alignment layer barrier may be positioned at a same plane as the surface of the common electrode. The first substrate may further include an overcoat layer disposed between the first base substrate and the common electrode, and the recess portion is formed by removing a portion of the common electrode and the overcoat layer.

The second substrate may further include a spacer disposed on the second substrate to maintain a distance between the first substrate and the second substrate and a second alignment layer barrier disposed in a non-display area of the second base substrate and protruded from the second base substrate in an area corresponding to a position of at least a portion of an end portion of the second alignment layer.

The second alignment layer barrier may be disposed in an area to align with the area of to the recess portion and spaced apart from the first alignment layer barrier when viewed in a plan view.

The second alignment layer barrier may include the same material as the second spacer and has the same height as the spacer.

The second alignment layer barrier may include a third barrier spaced apart from the second alignment layer and a fourth barrier overlapped with the second alignment layer, and the end portion of the second alignment layer is interposed between the third barrier and the fourth barrier. At least one of the third and fourth barriers may be provided in a plural number.

In another aspect, a method of manufacturing a display panel is provided including manufacturing a first substrate, manufacturing a second substrate, and forming a liquid crystal layer between the first substrate and the second substrate.

The first substrate is formed by sequentially forming an overcoat layer and a common electrode on a first base substrate, patterning the common electrode and the overcoat layer using a photolithography process to form a first barrier and a second barrier spaced apart from the first barrier, and forming a first alignment layer on the common electrode to allow an end portion of the first alignment layer to be disposed between the first and second barriers.

The forming of the first and second barriers are formed by forming a photoresist on the first base substrate, exposing and developing the photoresist to form a photoresist pattern, sequentially etching the common electrode and the overcoat layer using the photoresist pattern as a mask, and removing the photoresist pattern.

The second substrate is formed by forming a line part, a switching device, and a pixel electrode on a second base substrate, forming a spacer, a third barrier, and a fourth barrier on the second base substrate, and forming a second alignment layer on the second base substrate to allow an end portion of the second alignment layer to be disposed between the third and fourth barriers.

According to the above, defects caused by the alignment layers and the sealant part may be prevented from occurring on the display panel. In addition, the manufacturing process of the display panel may be simplified.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
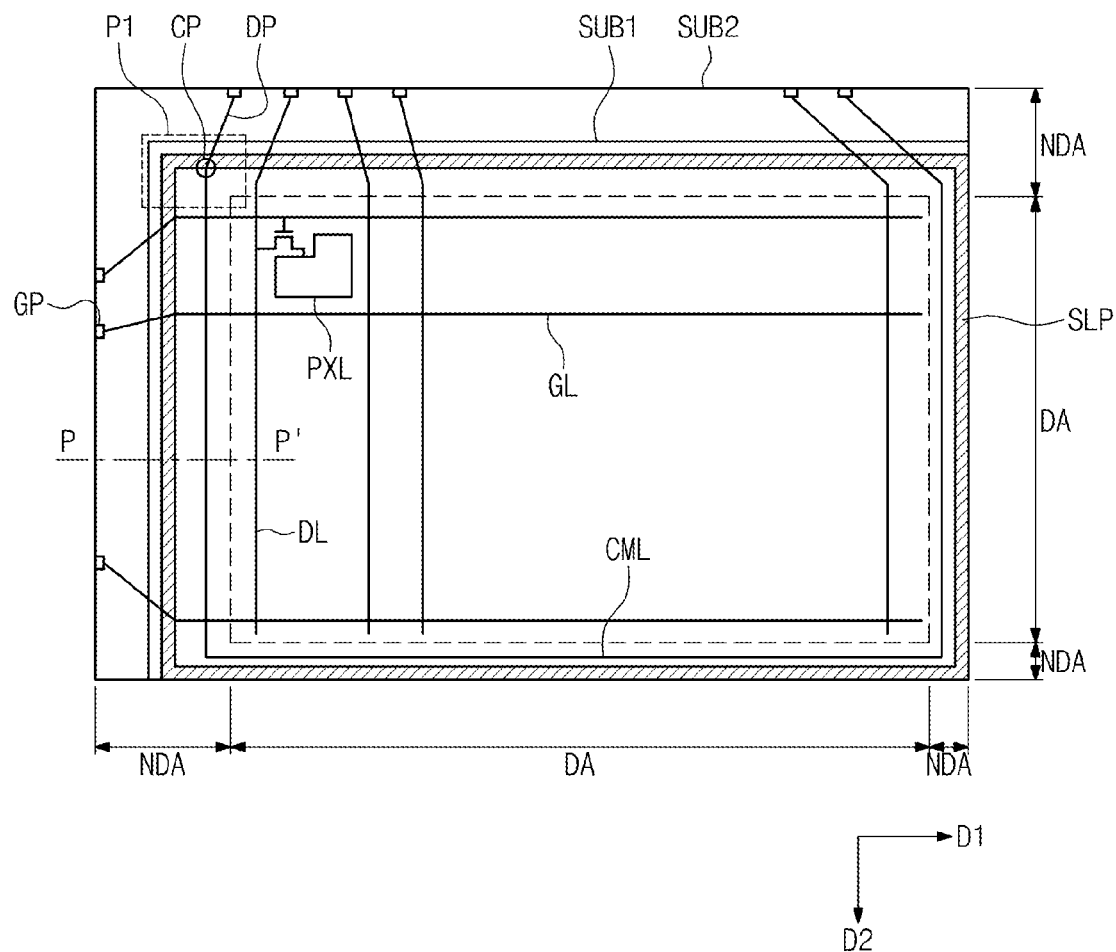
FIG. 1 is a plan view showing a display panel according to an exemplary embodiment.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation of the device. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
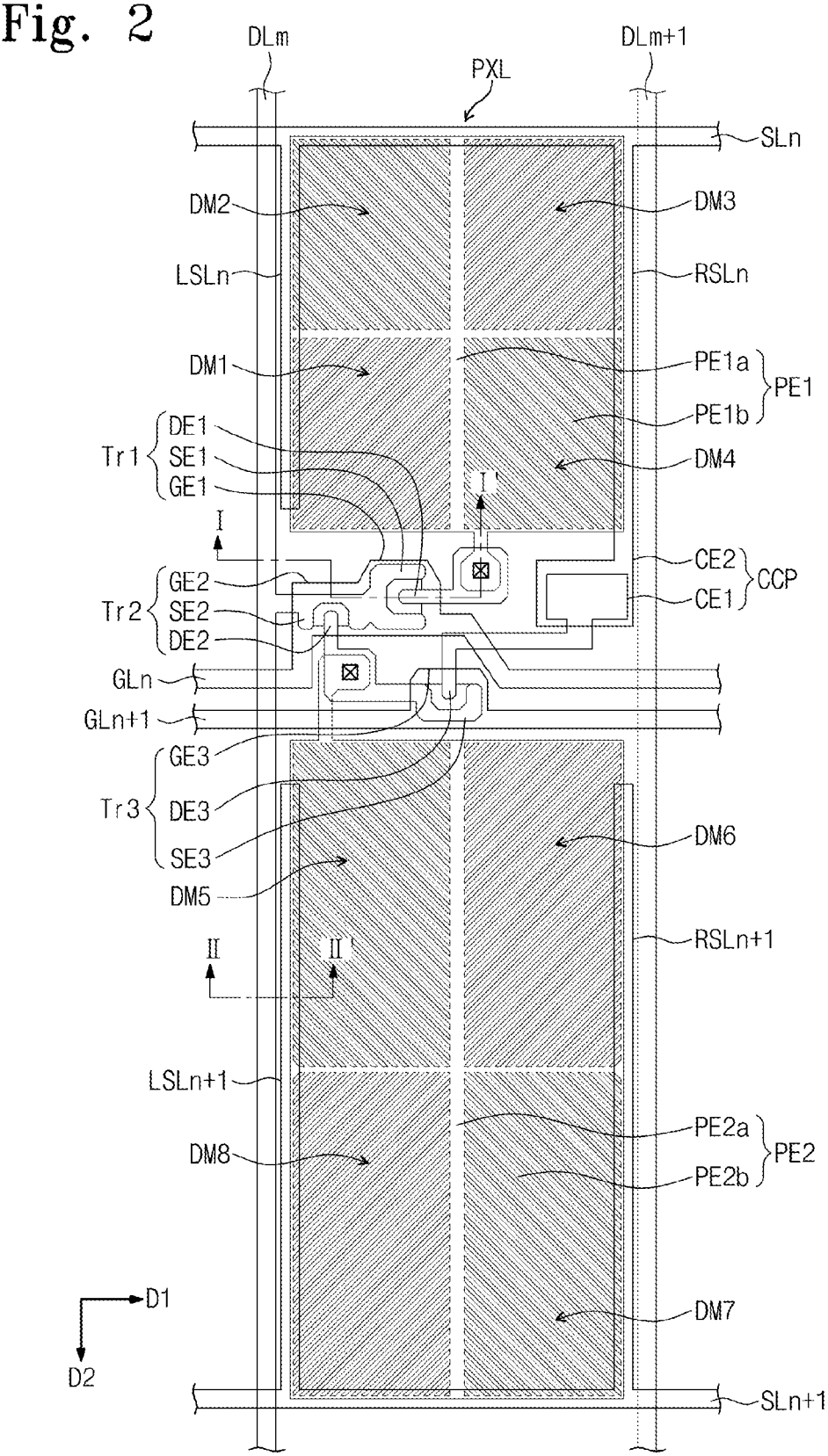
FIG. 2 is a plan view showing one pixel of the display panel shown in FIG. 1.
Figure 3:
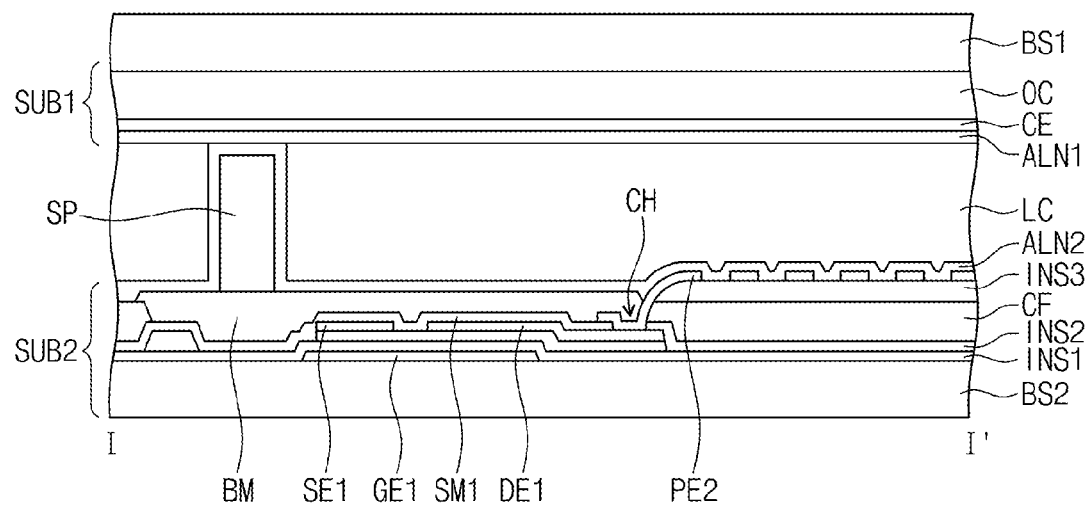
FIG. 3 is a cross-sectional view taken along a line I-I' of FIG. 2.
Figure 4:
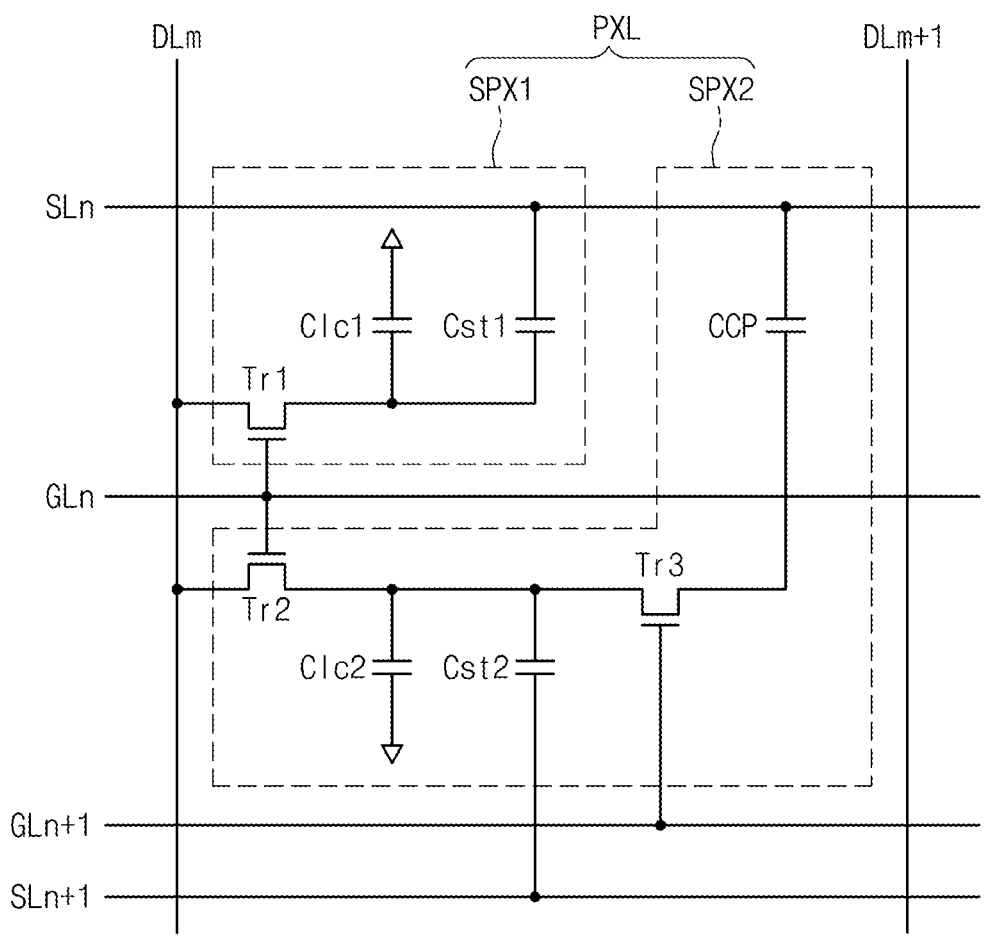
FIG. 4 is an equivalent circuit diagram of the pixel shown in FIG. 2.

FIG. 1 is a plan view showing a display panel according to an exemplary embodiment of the present disclosure, FIG. 2 is a plan view showing one pixel of the display panel shown in FIG. 1, FIG. 3 is a cross-sectional view taken along a line I-I' of FIG. 2, and FIG. 4 is an equivalent circuit diagram of the pixel shown in FIG. 2.

Referring to FIGS. 1 to 4, a display panel may have a rectangular shape with a pair of long sides and a pair of short sides.

The display panel includes an upper substrate SUB1, a lower substrate SUB2 facing the upper substrate SUB1, and a liquid crystal layer LC disposed between the upper substrate SUB1 and the lower substrate SUB2. The display panel includes a display area DA including a plurality of pixels PXL to display an image, and a non-display area NDA surrounding the display area DA.

In the present exemplary embodiment, a substrate on which thin film transistors are disposed is referred to as the lower substrate SUB2, and a substrate facing the lower substrate SUB2 is referred to as the upper substrate SUB1, but they should not be limited thereto or thereby. For instance, the upper substrate SUB1 and the lower substrate SUB2 may be referred to as first and second substrates, respectively, or vice versa.

The upper substrate SUB1 includes a first base substrate BS1, an overcoat layer OC, a common electrode CE, an alignment layer definition pattern, and a first alignment layer ALN1.

The first base substrate BS1 is an insulating substrate and may be transparent.

The first alignment layer ALN1 is used to initially align liquid crystal molecules of the liquid crystal layer LC, and includes a polymer material in which a decomposition, dimerization, or isomerization reaction occurs by light, e.g., an ultraviolet ray or a laser. In addition, the first alignment layer ALN1 may include a polymerized reactive mesogen.

The overcoat layer OC is disposed on the first base substrate SUB1 and formed of an organic or inorganic insulating material. The common electrode CE and the first alignment layer ALN1 are sequentially stacked on the first base substrate BS1.

The alignment layer definition pattern is used to control a position of the first alignment layer ALN1. In detail, in the alignment layer definition pattern, an end portion of the first alignment layer ALN1 is positioned in a predetermined area of the upper substrate SUB1, e.g., in the non-display area NDA that is spaced apart from the sealant part SLP.

The first alignment layer ALN1 is disposed on the first base substrate BS1 on which the common electrode CE is disposed.

The lower substrate SUB2 includes a second base substrate BS2, a line part (described below) disposed on the second base substrate BS2, the pixels PXL connected to the line part, and a second alignment layer ALN2 disposed on the pixels PXL.

The second base substrate BS2 is an insulating substrate and may be transparent.

The line part includes a plurality of gate lines GL, a plurality of data lines DL, and a common line CML, and the gate lines GL and the data lines DL are connected to external lines through gate pads GP and data pads DP, which are disposed in the non-display area NDA. The common line CML is electrically connected to the common electrode CE through a contact part CP disposed in the non-display area NDA. The contact part CP may be formed by dotting a conductive material, e.g., silver. The contact part CP is disposed in the non-display area NDA, and overlapped with the sealant part SLP or disposed adjacent to the sealant part SLP.

Each of the plurality of pixels PXL has the same configuration and function, and thus for the convenience of explanation, one pixel PXL has been shown with the gate line GL and the data line DL, which are adjacent to the one pixel PXL. In FIGS. 2 to 4, for the convenience of explanation, an n-th gate line GLn, an (n+1)th gate line GLn+1, an m-th data line DLm, and an (m+1)th data line DLm+1 have been shown with the one pixel PXL. Hereinafter, the n-th and (n+1)th gate lines GLn and GLn+1 are respectively referred to as first and second gate lines, and the m-th and (m+1)th gate lines DLm and DLm+1 are respectively referred to as first and second data lines.

The first and second gate lines GLn and GLn+1 are disposed on the second base substrate BS2 and extend in a first direction D1 so that they are substantially in parallel to each other. The first and second data lines DLm and DLm+1 are disposed on the second base substrate BS2 and extend in a second direction D2 so that they are substantially in parallel to each other. A first insulating layer INS1 is disposed between the first and second gate lines GLn and GLn+1 and the first and second data lines DLm and DLm+1.

Each pixel PXL includes a first sub-pixel SPX1 and a second sub-pixel SPX2. The first sub-pixel SPX1 includes a first thin film transistor Tr1, a second sub-pixel electrode PE1, and a first storage electrode part (described below). The second sub-pixel SPX2 includes a second thin film transistor Tr2, a second storage electrode part (described below), a third thin film transistor Tr3, a second sub-pixel electrode PE2, and a coupling capacitor CCP. The first and second sub-pixels SPX1 and SPX2 are disposed between the first data line DLm and the second data line DLm+1, which are adjacent to each other.

The first thin film transistor Tr1 of the first sub-pixel SPX1 is connected to the first data line DLm and the first gate line GLn.

The first thin film transistor Tr1 includes a first gate electrode GE1 branched from the first gate line GLn, a first source electrode SE1 branched from the first data line DLm, and a first drain electrode DE1 electrically connected to the first sub-pixel electrode PE1.

The first storage electrode part includes a first storage line SLn extended in the first direction D1 and first and second branch electrodes LSLn and RSLn branched from the first storage line SLn and extended in the second direction D2.

The first sub-pixel electrode PE1 is partially overlapped with the first storage line SLn and the first and second branch electrodes LSLn and RSLn to form a first storage capacitor.

The first sub-pixel electrode PE1 includes a trunk portion PE1a and a plurality of branch portions PE1b extended from the trunk portion PE1a in a radial form.

The trunk portion PE1a may have, for example, a cross shape as shown in FIG. 2. In this case, the first sub-pixel electrode PE1 is divided into a number of areas by the trunk portion PE1a. The first sub-pixel electrode PE1 is divided into a number of domains by the trunk portion PE1a. The branch portions PE1b are extended in different directions according to the domains. In the present exemplary embodiment, the first sub-pixel electrode PE1 includes first, second, third, and fourth domains DM1, DM2, DM3, and DM4. The branch portions PE1b are extended substantially in parallel to each other and are spaced apart from each other in each domain. The branch portions PE1b, which are adjacent to each other, are spaced apart from each other in with a distance in the range of micrometers. Due to the above-mentioned structure, liquid crystal molecules of the liquid crystal layer LC may be aligned at a specific angle with respect to a plane parallel to the first base substrate BS1.

The second thin film transistor Tr2 includes a second gate electrode GE2 branched from the first gate line GLn, a second source electrode SE2 branched from the first data line DLm, and a first drain electrode DE1 electrically connected to the second sub-pixel electrode PE2.

The second storage electrode part includes a second storage line SLn+1 extended in the second direction D2 and third and fourth branch electrodes LSLn+1 and RSLn+1 branched from the second storage line SLn+1 and extended in the second direction D2.

The second sub-pixel electrode PE2 is partially overlapped with the second storage line SLn+1 and the third and fourth branch electrodes LSLn+1 and RSLn+1 to form a second storage capacitor.

The second sub-pixel electrode PE2 includes a trunk portion PE2a and a plurality of branch portions PE2b extended from the trunk portion PE2a in a radial form. The trunk portion PE2a may have the cross shape as shown in FIG. 2. In this case, the second sub-pixel electrode PE2 is divided into a number of areas by the trunk portion PE2a. The second sub-pixel electrode PE2 is divided into a number of domains by the trunk portion PE2a. The branch portions PE2b are extended in different directions according to the domains. In the present exemplary embodiment, the second sub-pixel electrode PE2 includes fifth, sixth, seventh, and eighth domains DM5, DM6, DM7, and DM8. The branch portions PE2b are extended substantially in parallel to each other and are spaced apart from each other in each domain. The branch portions PE2b, which are adjacent to each other, are spaced apart from each other in terms of micrometer. Due to the above-mentioned structure, liquid crystal molecules of the liquid crystal layer LC may be aligned at a specific angle with respect to a plane parallel to the second base substrate BS2.

The third thin film transistor Tr3 includes a third gate electrode GE3 branched from the second gate lien GLn+1, a third source electrode SE3 extended from the second drain electrode DE2, and a third drain electrode DE3 connected to a coupling capacitor electrode CE1. The coupling capacitor CCP includes the coupling capacitor electrode CE1 and an opposite electrode CE2 extended from the second branch electrode RSLn to form the coupling capacitor CCP, but the coupling capacitor CCP should not be limited thereto or thereby.

The first and second sub-pixel electrodes PE1 and PE2 form a pixel electrode PE. The pixel electrode PE may be formed of a transparent conductive material. In particular, the pixel electrode PE may be formed of a transparent conductive oxide, e.g., indium tin oxide, indium zinc oxide, indium tin zinc oxide, etc.

Referring to FIG. 3, the lower substrate SUB2 includes the first insulating layer INS1, a second insulating layer INS2, color filters CF, a black matrix BM, a third insulating layer INS3, and a spacer SP. The color filters CF and the black matrix BM are disposed on the second insulating layer INS2. The color filters CF are disposed in positions that correspond to the positions of the pixels, respectively, and each color filter CF has a red R, green G, or blue B color. The black matrix BM is disposed between the color filters CF to block the light passing through between the color filters CF. The black matrix BM covers the channel portion of the first, second, and third thin film transistors Tr1, Tr2, and Tr3. The third insulating layer INS3 is disposed on the black matrix BM and the color filters CF.

In an exemplary embodiment, the spacer SP is disposed between the lower substrate SUB2 and the upper substrate SUB1 to maintain a distance between the lower substrate SUB2 and the upper substrate SUB1. As an example, the distance between the upper substrate SUB1 and the lower substrate SUB2 is in a range from about 2.0 micrometers to about 4.0 micrometers.

The spacer SP is disposed on the second base substrate BS2 on which the pixel electrode PE is disposed. The spacer SP is disposed in a position that corresponds to the position of the black matrix BM and has a black color.

The second alignment layer ALN2 is disposed on the second base substrate BS2 on which the pixels are disposed. The second alignment layer ALN2 is used to initially align the liquid crystal molecules of the liquid crystal layer LC, and includes a polymer material in which a decomposition, dimerization, or isomerization reaction occurs by light, e.g., an ultraviolet ray or a laser. In addition, the first alignment layer ALN1 may include a polymerized reactive mesogen.

The liquid crystal layer LC is disposed between the second alignment layer ALN2 and the first alignment layer ALN1. The liquid crystal molecules of the liquid crystal layer LC are vertically aligned to the first and second alignment layers ALN1 and ALN2 when an electric field does not exist between the pixel electrode PE and the common electrode CE.

The liquid crystal layer LC and the sealant part SLP (FIGS. 1 and 5) are disposed between the upper substrate SUB1 and the lower substrate SUB2. The sealant part SLP seals the liquid crystal layer LC between the upper substrate SUB1 and the lower substrate SUB2. When viewed in a plan view, the sealant part SLP is provided along an end portion of the upper substrate SUB1 to surround the liquid crystal layer LC and includes organic polymer.

In the display panel, when a gate signal is applied to the gate line GLn, the thin film transistor Tr is turned on. Accordingly, a data signal applied to the data line DLm is applied to the pixel electrode PE through the on-state thin film transistor Tr. When the data signal is applied to the pixel electrode PE through the on-state thin film transistor Tr, the electric field is generated between the pixel electrode PE and the common electrode CE. The liquid crystal molecules of the liquid crystal layer LC are driven by the electric field generated between the common electrode CE and the pixel electrode PE. Thus, the transmittance of the light passing through the liquid crystal layer LC is changed, and thus the image is displayed.

In the present exemplary embodiment, each pixel is connected to one gate line GLn and two data lines DLm and DLm+1, but it should not be limited thereto or thereby. For instance, each pixel may be connected to two data lines and one data line. In addition, each pixel includes two sub-pixel electrodes, but the number of the sub-pixel electrodes should not be limited to two. That is, each pixel may include three sub-pixel electrodes. The number of the pixel electrodes depends on a design of each pixel. For instance, each pixel is divided into a number of sub-pixels, and each sub-pixel may correspond to at least one sub-pixel electrode.

Figure 5:
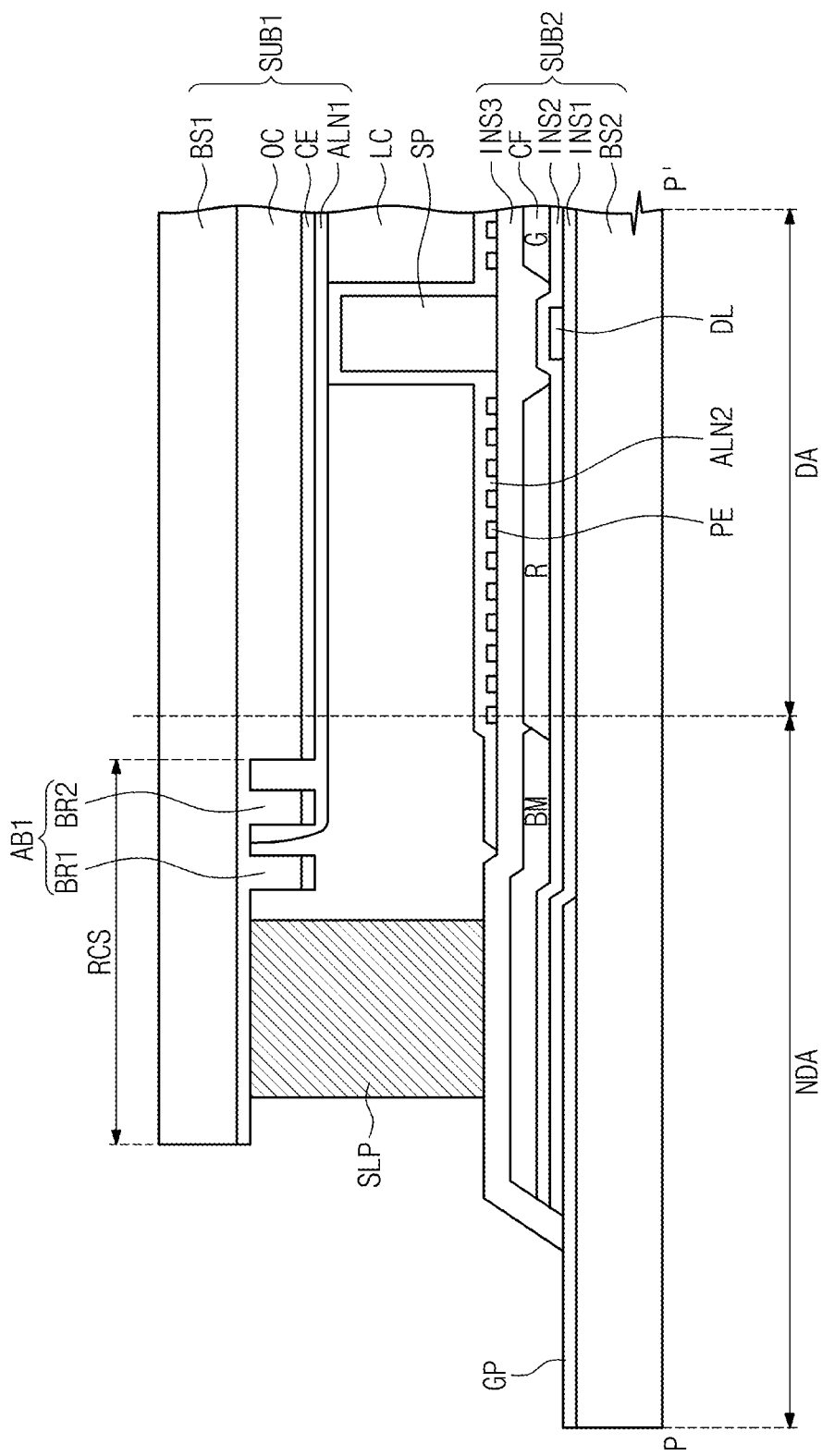
FIG. 5 is a cross-sectional view taken along a line P-P' of FIG. 1.
Figure 6:
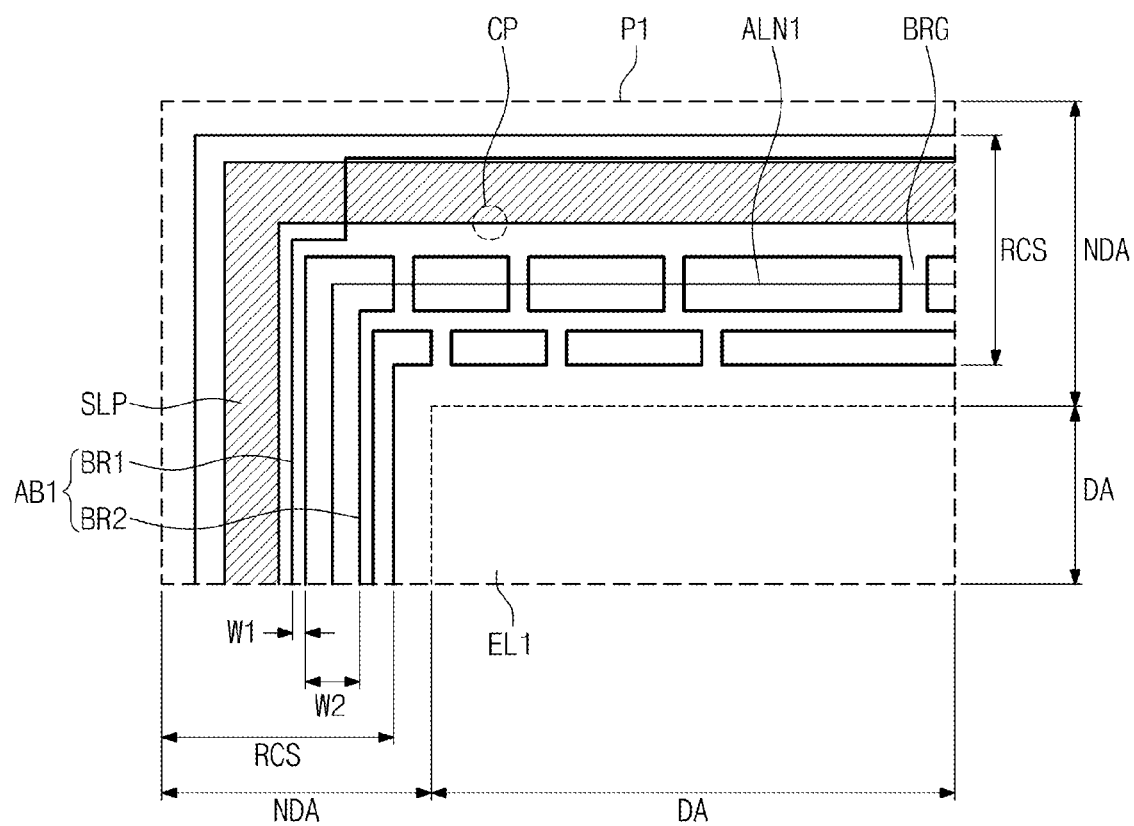
FIG. 6 is a plan view showing a portion of the display panel shown in FIG. 1.

FIGS. 5 and 6 show a portion of the display panel and will be used to explain the alignment layer definition pattern. FIG. 5 is a cross-sectional view taken along a line P-P' of FIG. 1 and FIG. 6 is a plan view showing an expanded view of a portion of the display panel shown in FIG. 1.

Referring to FIGS. 5 and 6, the alignment layer definition pattern is provided on the upper substrate SUB1. The alignment layer definition pattern has a protrusion portion, e.g., a dam shape, as described in more detail below, to allow the alignment layer to be formed in a predetermined area when the alignment layer is formed.

In general, the alignment layer is formed by coating an alignment solution on a substrate and curing the alignment solution. Because the alignment solution is provided in a fluid form having a surface tension, the alignment solution may be overcoated, not coated enough, taken off after being coated, or infiltrated into the other areas of the display according to the topology of and other properties of the substrate. To prevent the above-mentioned defects, a protrusion portion having the dam shape is formed in the area adjacent to the end portion of the alignment layer, i.e., the contact portion between the upper surface of the alignment layer and the substrate.

The alignment layer definition pattern includes a recess portion RCS provided on the upper substrate SUB1 and an alignment layer barrier AB1 protruded from the recess portion RCS.

The recess portion RCS is defined by removing portions of the overcoat layer OC and the common electrode CE disposed on the upper substrate SUB1. The recess portion RCS has a depth in the overcoat layer OC that is smaller than a thickness of the overcoat layer OC, such that a portion of the overcoat layer OC remains on a bottom portion of the recess portion RCS. For instance, when the overcoat layer OC has a thickness of about 0.5 micrometers or more, the depth of the recess portion RCS is smaller than about 0.5 micrometers and greater than about 0.3 micrometers.

The recess portion RCS is disposed only in the non-display area NDA of the upper substrate SUB1, and is provided along the end portion of the upper substrate SUB1. That is, the recess portion RCS is extended along the long sides and the short sides of the upper substrate SUB1.

The alignment layer barrier AB1 (hereinafter, referred to as a first alignment layer barrier to be distinct from an alignment layer in another embodiment) is disposed in the recess portion RCS. The first alignment layer barrier AB1 is extended along the long and short sides of the upper substrate SUB1 as is the recess portion RCS. In the present exemplary embodiment, the first alignment layer barrier AB1 is extended along all sides, long and short, of the upper substrate SUB1, but it should not be limited thereto or thereby. That is, the first alignment layer barrier AB1 may be extended on only portions of each side of the upper substrate SUB1. In addition, when viewed in a plan view, the first alignment layer barrier AB1 may have a zigzag shape in portions of the long and short sides or may be bent in a vertical direction with respect to the long and short sides as long, as the first alignment layer barrier AB1 is extended along the long and short sides.

The first alignment layer barrier AB1 includes a first barrier BR1 to prevent the alignment solution from being coated on the area for the sealant part SLP and a second barrier BR2 to prevent the alignment solution from being backdrafted into the display area DA while the display panel is manufactured.

The first and second barriers BR1 and BR2 are disposed between the sealant part SLP and the display area DA, and the first barrier BR1 is positioned outside the second barrier BR2, closer to the edge of the upper substrate SUB1, when viewed in a plan view.

In the present exemplary embodiment, the sealant part SLP is spaced apart from the first barrier BR1 of the first alignment layer barrier AB1. In this case, the alignment solution does not infiltrate into the area in which the sealant part SLP is formed, and thus adhesive strength of the sealant part SLP may be improved with respect to the upper substrate SUB1 and the lower substrate SUB2. In addition, according to embodiments, the sealant part SLP may be overlapped with the first barrier BR1 of the first alignment layer barrier AB1 when viewed in a plan view, the adhesive strength of the sealant part SLP may be maintained because the alignment layer is formed only in the predetermined area even though the sealant part SLP and the first barrier BR1 are partially overlapped with each other.

The first alignment layer ALN1 covers the entire of the display area DA and a portion of the non-display area NDA, and its end portion is located at a position adjacent to the first alignment layer barrier AB1. In detail, because the end portion of the first alignment layer ALN1 is restricted by the first and second barriers BR1 and BR2, the end portion of the first alignment layer ALN1 is disposed between the first barrier BR1 and the second barrier BR2. The second barrier BR2 is overlapped with the first alignment layer ALN1.

The first and second barriers BR1 and BR2 are protruded from the recess portion RCS, but the first and second barriers BR1 and BR2 are formed by removing a portion of the common electrode CE and the overcoat layer OC. Therefore, the upper surface of the first and second barriers BR1 and BR2 are located at the same plane as that of the common electrode CE.

When viewed in a plan view, each of the first and second barriers BR1 and BR2 has a width W1 of about 3.0 micrometers or more and a distance W2 between the first and second barriers BR1 and BR2 is about 3.0 micrometers or more.

In the upper substrate SUB1, a bridge BRG is provided in the area in which the contact part CP is formed to connect the common line and the common electrode CE. The bridge BRG connects the common electrode CE, the first barrier BR1, and the second barrier BR2. The common voltage is applied to the common electrode CE from the contact part CP through the bridge BRG. A number of bridges BRG may be provided between the common electrode CE and the first barrier BR1 and between the first barrier BR1 and the second barrier BR2. Each bridge BRG is spaced apart from an adjacent bridge thereto to prevent the alignment solution from moving along the bridge BRG, and the bridges are in a zigzag arrangement.

According to an exemplary embodiment, in the lower substrate SUB2, the end portion of the second alignment layer ALN2 is disposed between the sealant part SLP and the display area DA. The lower substrate SUB2 includes the line part, the thin film transistors, and the insulating layers, and the topology of the surface of the lower substrate SUB2 is easily controlled while the above-mentioned elements are formed on the lower substrate SUB2. Thus, the end portion of the second alignment layer ALN2 may be formed to be positioned at a desired position.

In a display panel having the above-mentioned structure, the alignment layer may be formed in a desired position or area, and defects caused by misalignment of the alignment layer may be prevented. That is, the alignment solution may be prevented from being overcoat, not coated enough, taken off after being coated, or infiltrated into another area. In particular, because the area in which the alignment solution is overlapped with the sealant part is reduced, the adhesive strength of the sealant part may be improved. In addition, defects in which the display area is not fully covered due to the backdraft of the alignment solution may be prevented. Further, the alignment solution may be prevented from being overcoated on the contact part, so that a contact defect between the common electrode and the common line may be prevented. Further, the position of the alignment solution is easily determined, the width of the sealant part may be set to various values, and a material for the sealant part may be prevented from being overcoated, not coated enough, taken off after being coated, or infiltrated into the other area.

Figure 7:
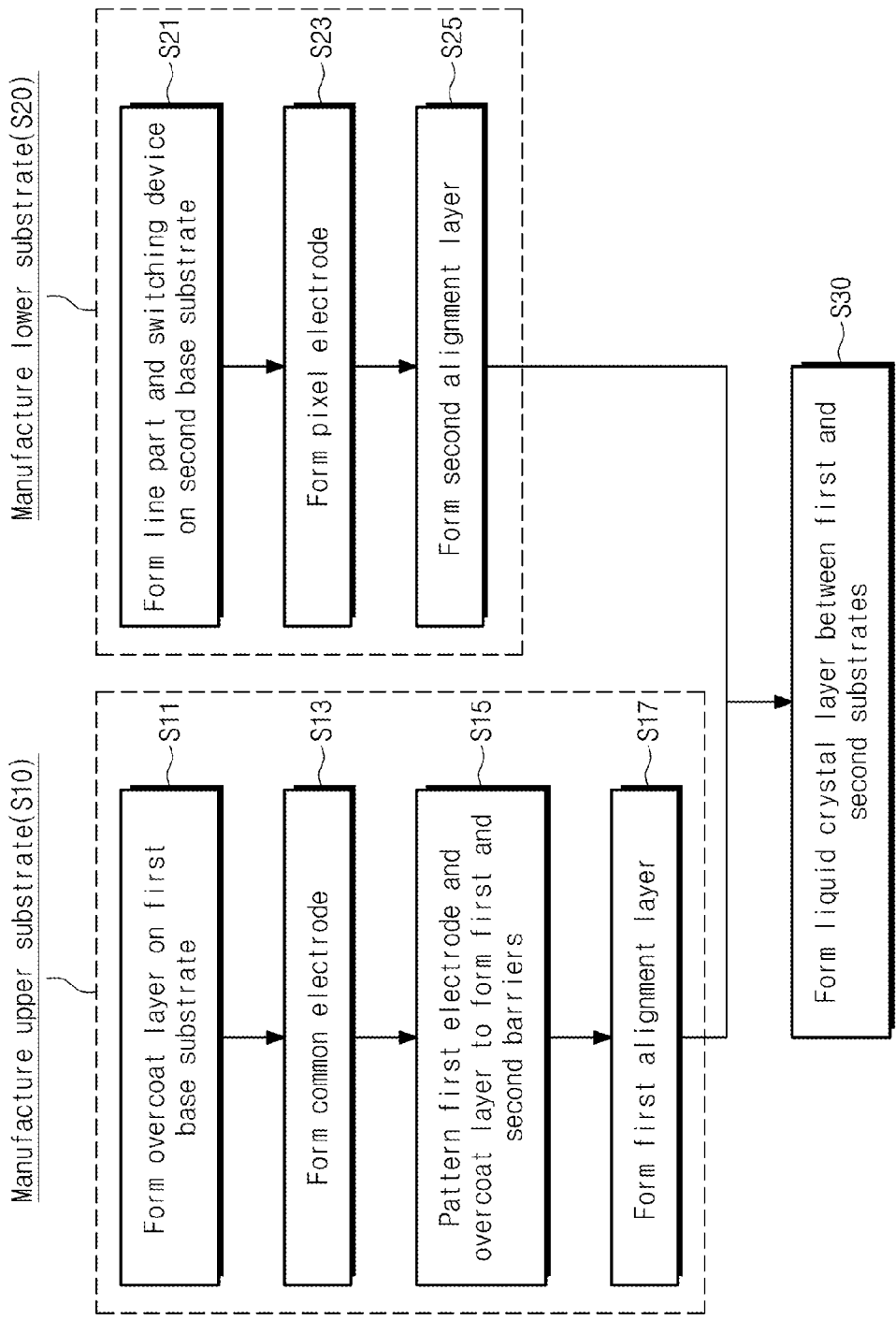
FIG. 7 is a flowchart showing a method of manufacturing a display panel according to an exemplary embodiment of the present disclosure.

FIG. 7 is a flowchart showing a method of manufacturing the display panel according to an exemplary embodiment of the present disclosure.

Referring to FIG. 7, the display panel is manufactured by manufacturing the upper substrate SUB1 (S10), manufacturing the lower substrate SUB2 (S20), and forming the liquid crystal layer LC between the upper substrate SUB1 and the lower substrate SUB2 (S30).

The upper substrate SUB1 is manufactured by sequentially forming the overcoat layer OC and the common electrode CE on the first base substrate BS1 (S11 and S13), patterning the common electrode CE and the overcoat layer OC using a photolithography process to form the first and second barriers BR1 and BR2 spaced apart from each other (S15), and forming the first alignment layer ALN1 on the common electrode CE to allow the end portion of the first alignment layer ALN1 to be disposed between the first and second barrier BR1 and BR2 (S17).

The lower substrate SUB2 is manufactured by forming the line part, the switching device, and the pixel electrode PE on the second base substrate BS2 (S21 and S23) and forming the second alignment layer ALN2 on the second base substrate BS2 (S25).

The liquid crystal layer LC is formed between the upper substrate SUB1 and the lower substrate SUB2 by forming the sealant part SLP on the upper substrate SUB1 or the lower substrate SUB2, dropping liquid crystal in the area surrounded by the sealant part SLP, and coupling the upper substrate SUB1 and the lower substrate SUB2.

Before the second alignment layer ALN2 is formed on the lower substrate SUB2, the spacer is formed on the lower substrate SUB2 to maintain the distance between the upper substrate SUB1 and the lower substrate SUB2.

FIGS. 8A to 8G are cross-sectional views showing a method of manufacturing the first substrate of the manufacturing method of the display panel according to an exemplary embodiment of the present disclosure.

Figure 8A:
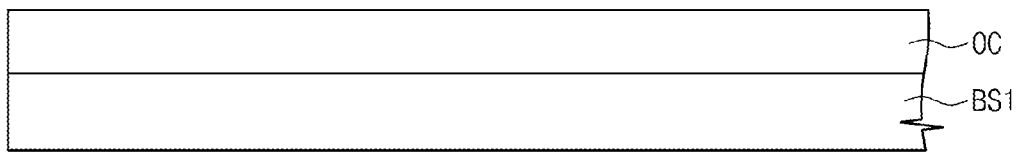
FIGS. 8A to 8G are cross-sectional views showing a method of manufacturing a first substrate of the manufacturing method of the display panel according to an exemplary embodiment of the present disclosure.

Referring to FIG. 8A, the first base substrate BS1 is prepared and the overcoat layer OC is formed on the first base substrate BS1. The overcoat layer OC may be formed of an organic or inorganic insulating layer.

Figure 8B:
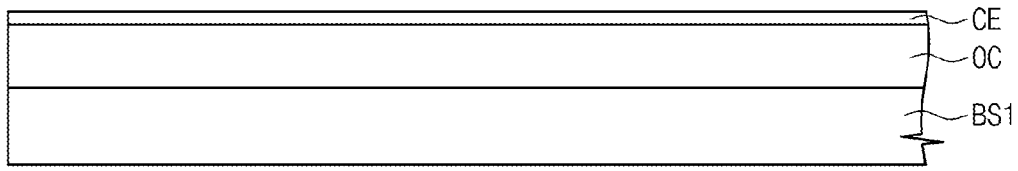

Referring to FIG. 8B, the common electrode CE is formed on the overcoat layer OC. The common electrode CE may include the transparent conductive material, e.g., indium tin oxide, indium zinc oxide, etc.

Figure 8C:
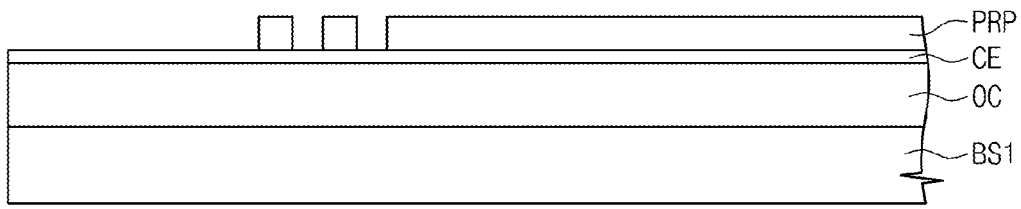

Referring to FIG. 8C, a photoresist is formed on the common electrode CE and the photoresist is exposed and developed using a mask to form a photoresist pattern PRP. Through the exposure and development process, the photoresist is partially removed, and thus portions of the upper surface of the common electrode CE are exposed through the photoresist pattern PRP. The recess portion RCS is formed in the area in which the upper surface of the common electrode CE is exposed, but the photoresist remains in the area in which the first alignment layer barrier AB1 is formed.

Figure 8D:
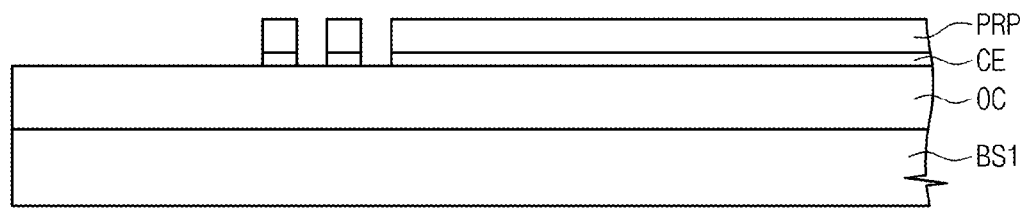
Figure 8E:
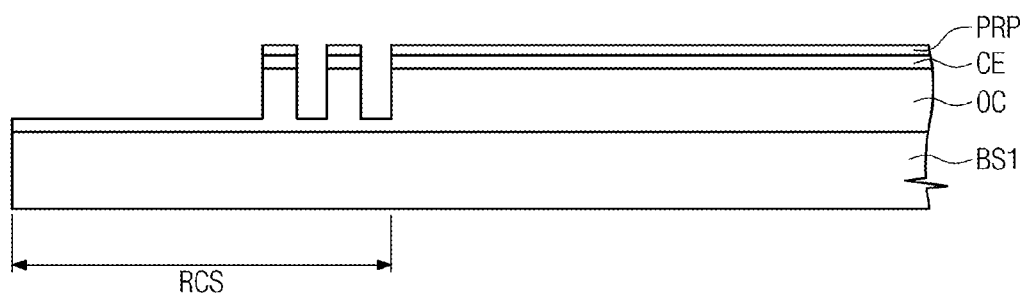

Then, the common electrode CE and the overcoat layer OC are sequentially etched using the photoresist pattern PRP as a mask. Referring to FIG. 8D, the common electrode CE is patterned using the photoresist pattern PRP as the mask. Due to the patterning of the common electrode CE, portions of the overcoat layer OC are exposed. Referring to FIG. 8E, the overcoat layer OC is ashed using the photoresist pattern PRP as a mask. The ashing process is performed using plasma. Due to the ashing process, the photoresist pattern PRP is partially removed in a thickness direction thereof and the overcoat layer OC is partially removed.

Figure 8F:
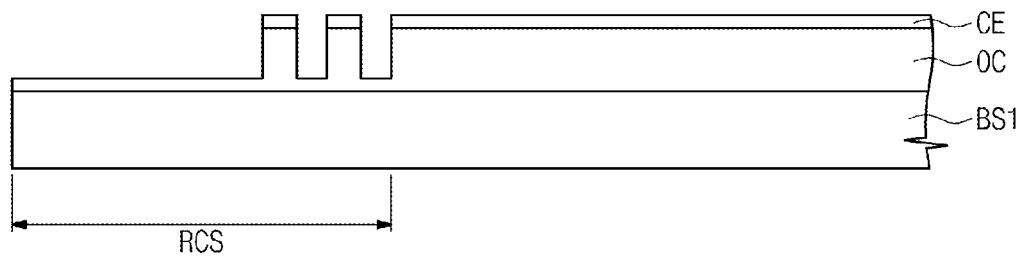

Referring to FIG. 8F, the photoresist pattern PRP is removed, so that the upper surface of the common electrode CE is exposed.

Figure 8G:

Referring to FIG. 8G, the alignment solution is coated on the upper surface of the common electrode CE and cured to form the first alignment layer ALN1. The alignment solution is coated such that its end portion is disposed between the first and second barriers BR1 and BR2. Movement of the alignment solution to the end portion of the first base substrate BS1 is blocked by the first and second barriers BR1 and BR2, and thus the end portion of the alignment solution is restricted between the first and second barriers BR1 and BR2. Although not shown in figures, in a case in which a reactive mesogen is used, the forming of the alignment layer further includes irradiating the light onto the liquid crystal layer LC including the reactive mesogen.

As described above, because the end portion of the first alignment layer ALN1 is controlled to be between the first and second barriers BR1 and BR2, defects related to the first alignment layer ALN1 may be prevented. In addition, the first and second barriers BR1 and BR2 serve as a barrier of the first alignment layer ALN1 and a barrier of the sealant part SLP. That is, when the sealant part SLP is formed, the material for the sealant part SLP may be prevented from being spreading into the display area DA by the first and second barriers BR1 and BR2.

Figure 9:
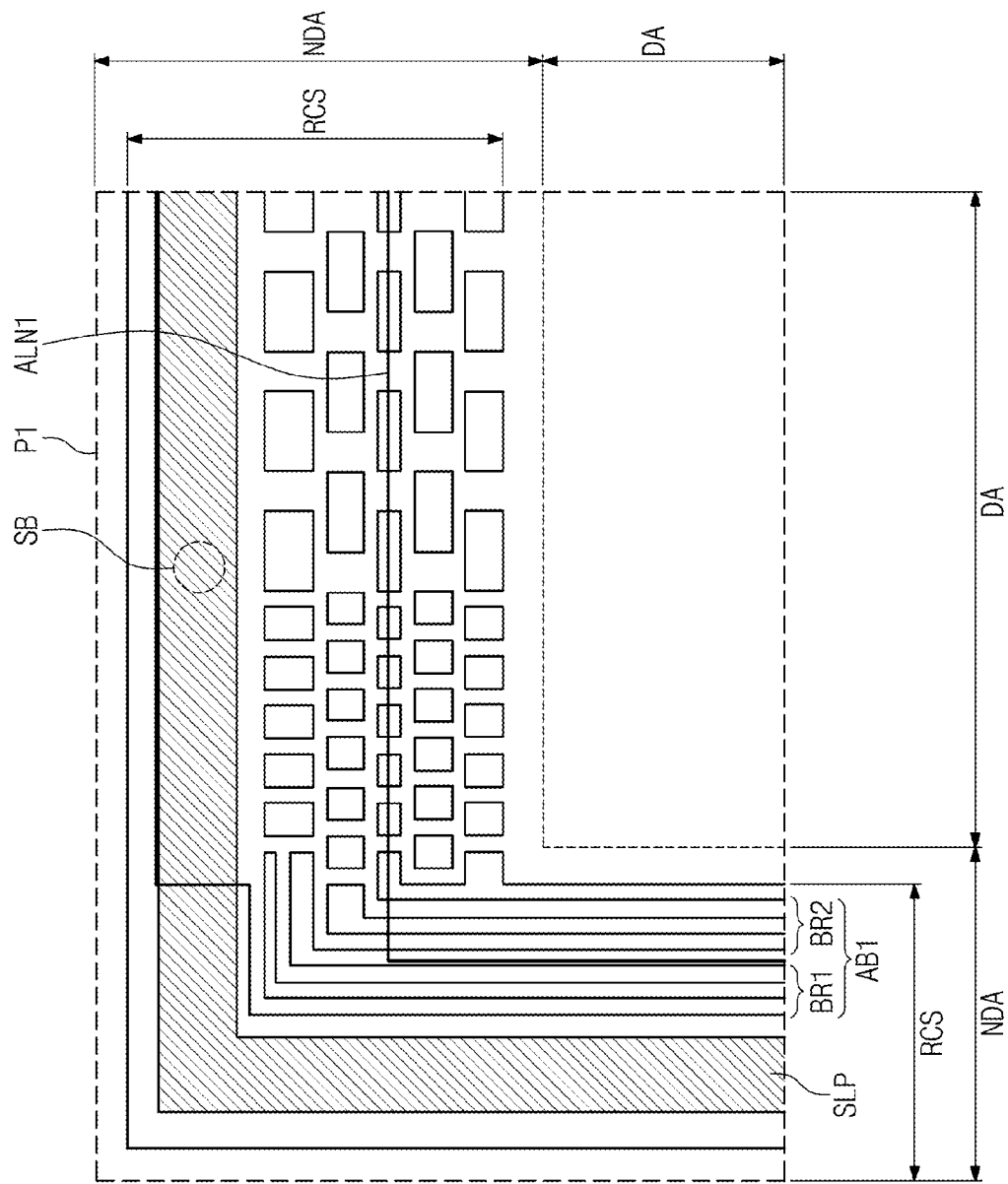
FIG. 9 is a plan view showing a portion of a display panel according to another exemplary embodiment of the present disclosure.

FIG. 9 is a plan view showing a portion of a display panel according to another exemplary embodiment of the present disclosure. In FIG. 9, the reference numerals denote the same elements as in FIGS. 1 to 6, and thus detailed descriptions of the same elements will be omitted.

Referring to FIG. 9, at least one of the first and second barriers BR1 and BR2 is provided in a plural number. In the present exemplary embodiment, two first barriers BR1 and two second barriers BR2 are provided, but the number of the first and second barriers BR1 and BR2 should not be limited to two. In addition, the second barrier BR2 may be provided in a plural number, and the first barrier BR1 may be provided in a singular number.

Here, each of the first barriers BR1 is extended in the direction in which the recess portion RCS is extended. In addition, the first barriers BR1 are spaced apart from each other. Each of the second barriers BR2 is extended in the extension direction of the recess portion RCS, and the second barriers BR2 are spaced apart from each other.

When viewed in a plan view, the first and second barriers BR1 and BR2 may have a zigzag shape in portions of the long and short sides or may be bent in a vertical direction with respect to the long and short sides, as long as the first and second barriers BR1 and BR2 are extended along the long and short sides. In addition, bridges BRG may be provided between the first barriers BR1 adjacent to each other and between the second barriers BR2 adjacent to each other, and each of the bridges BRG is spaced apart from an adjacent bridge thereto to prevent the alignment solution from moving along the bridge BRG, and in the bridges have a zigzag arrangement. The bridges BRG are disposed in the area adjacent to the contact part CP that connects the common line and the common electrode CE.

In the present exemplary embodiment, when each of the first and second barriers BR1 and BR2 is provided in the plural number, defects caused by the first alignment layer ALN1 and the sealant part SLP may be effectively prevented. Although not shown in figures, at least one of third and fourth barriers may be provided in a plural number as are the first and second barriers BR1 and BR2.

Figure 10:
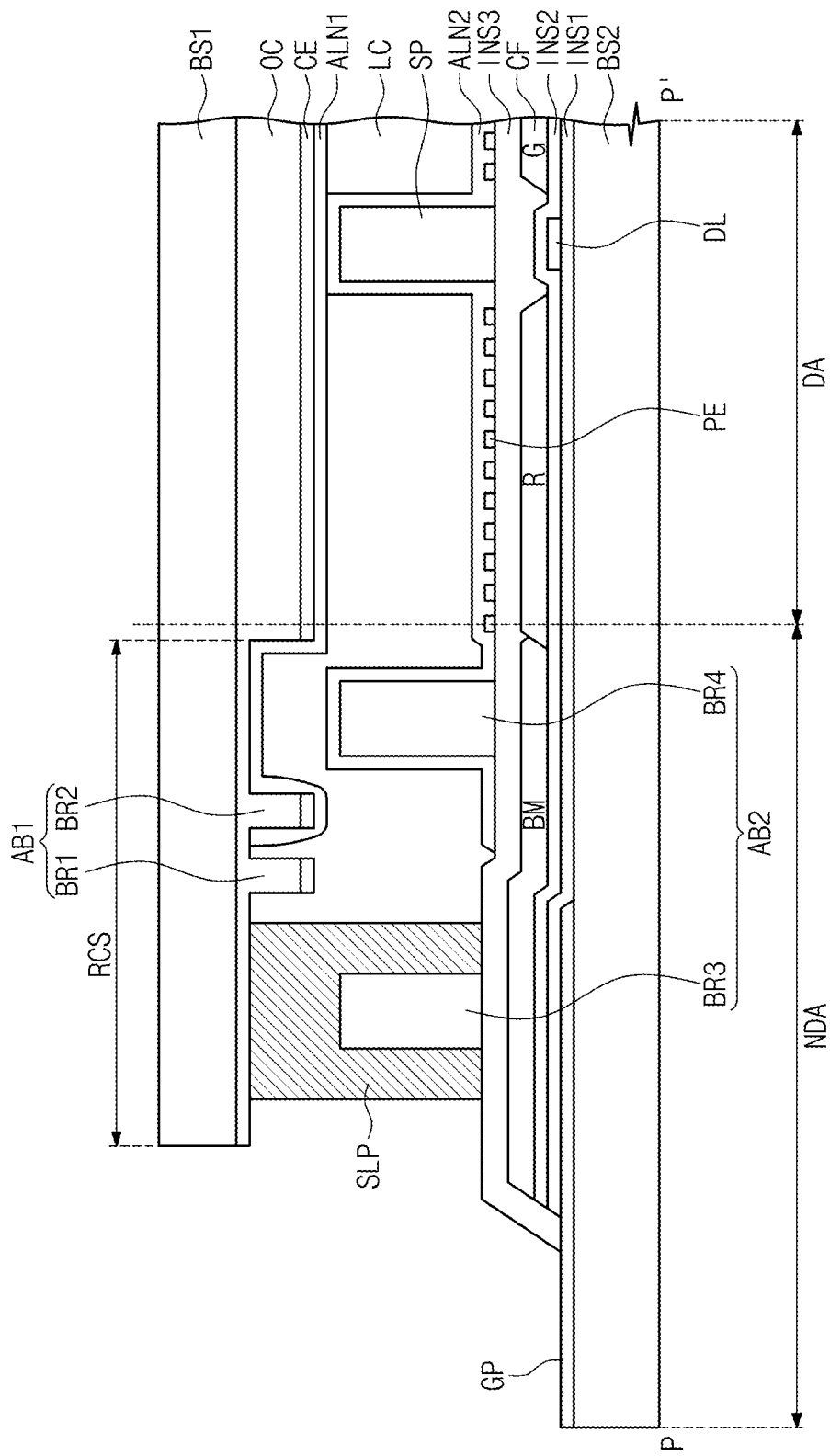
FIG. 10 is a cross-sectional view showing a display panel according to another exemplary embodiment of the present disclosure.

FIG. 10 is a cross-sectional view showing a display panel according to another exemplary embodiment of the present disclosure.

Referring to FIG. 10, an alignment layer definition pattern is disposed on the upper substrate SUB1 and the lower substrate SUB2. The alignment layer definition pattern of the lower substrate SUB2 has a protrusion portion, e.g., a dam shape, to allow the second alignment layer ALN2 to be formed in a predetermined area when the second alignment layer ALN2 is formed.

The alignment layer definition pattern disposed on the lower substrate SUB2 includes a second alignment layer barrier AB2 protruded from the lower substrate SUB2 on which the pixel electrode PE is formed. That is, the second alignment layer barrier AB2 may be formed together with the spacer SP. For instance, when an organic layer is formed on the lower substrate SUB2 on which the pixel electrode PE is formed and the organic layer is patterned, the spacer SP and the second alignment layer barrier AB2 may be formed.

The second alignment layer barrier AB2 includes a third barrier BR3 to prevent an alignment solution including the material for the second alignment layer ALN2 from spreading into the area in which the sealant part SLP is formed, and a fourth barrier BR4 to prevent the alignment solution from being backdrafted to the display area DA. The third and fourth barriers BR3 and BR4 are disposed between the sealant part SLP and the display area DA, and the third barrier BR3 is positioned outside the fourth barrier BR4 (closer to the edge of the lower substrate SUB2) when viewed in a plan view.

When viewed in a plan view, the third and fourth barriers BR3 and BR4 are not overlapped with the first and second barriers BR1 and BR2. That is, the third and fourth barriers BR3 and BR4 are spaced apart from the first and second barriers BR1 and BR2 when viewed in a plan view.

The second alignment layer ALN2 covers the entirety of the display area DA and a portion of the non-display area NDA, and its end portion is located at a position adjacent to the second alignment layer barrier AB2. In detail, the end portion of the second alignment layer ALN2 is restricted by the third and fourth barriers BR3 and BR4 to be disposed between the third and fourth barriers BR3 and BR4. The fourth barrier BR4 is overlapped with the second alignment layer ALN2.

In the present exemplary embodiment, the sealant part SLP is partially or fully overlapped with the third barrier BR3 of the second alignment layer barrier AB2 or spaced apart from the third barrier BR3. Although the third barrier BR3 is overlapped with the sealant part SLP, the adhesive strength of the sealant part SLP is maintained because the alignment layer is restricted to the portion of the area.

In the display panel having the above-mentioned structure, the alignment layer may be formed in a desired position or area of the upper and lower substrates SUB1 and SUB2, and thus defects caused by misalignment of the alignment layer may be prevented.

Figure 11:
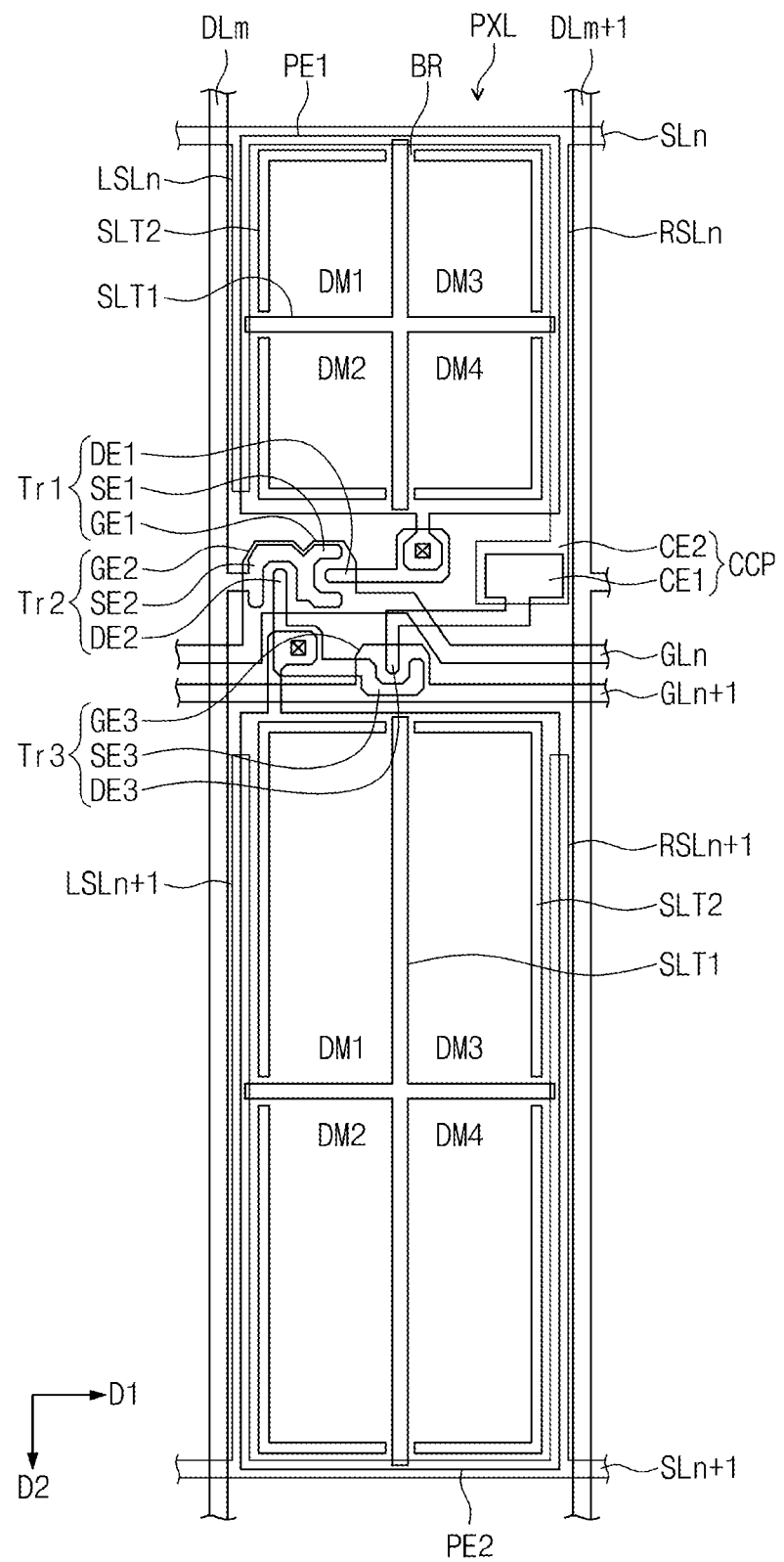
FIG. 11 is a plan view showing a display panel according to another exemplary embodiment of the present disclosure.
Figure 12:
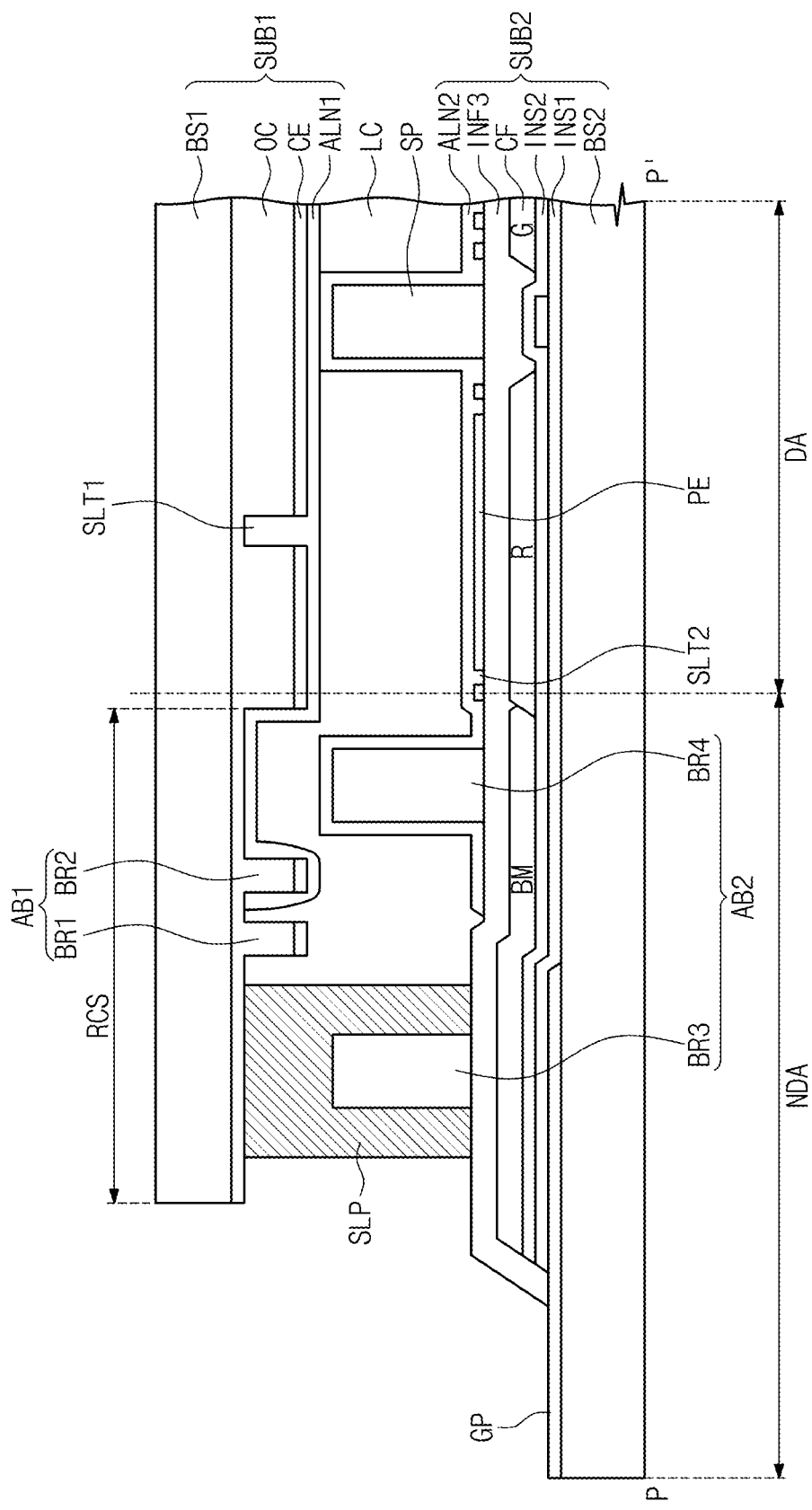
FIG. 12 is a cross-sectional view taken along a corresponding line P-P' of FIG. 1 in the another exemplary embodiment of the present disclosure.

FIG. 11 is a plan view showing a display panel according to another exemplary embodiment of the present disclosure and FIG. 12 is a cross-sectional view taken along a corresponding line P-P' of FIG. 1 in the another exemplary embodiment of the present disclosure.

Referring to FIGS. 11 and 12, the display panel according the present exemplary embodiment has the same configuration and function as those of the display panel shown in FIGS. 1 to 5 except for the shape of electrodes. Accordingly, the parts of the display panel according to the present exemplary embodiment that are different from those of the display panel shown in FIGS. 1 to 5 will be described in detail.

In the present exemplary embodiment, the common electrode CE of the upper substrate SUB1 includes a first slit SLT1 corresponding to each of the first and second sub-pixel electrodes PE1 and PE2. The first slit SLT1 is substantially in parallel to at least one side of each of the first and second sub-pixel electrodes PE1 and PE2, and crosses a center portion of each of the first and second sub-pixel electrodes PE1 and PE2 when viewed in a plan view. For instance, the first slit SLT1 has a cross shape to cross the center portion of each of the first and second sub-pixel electrodes PE1 and PE2 and to be substantially in parallel to the long and short sides of each of the first and second sub-pixel electrodes PE1 and PE2.

The first and second sub-pixel electrodes PE1 and PE2 form the pixel electrode PE. The pixel electrode PE shown in FIGS. 1 to 5 is provided with the branch portions, but the pixel electrode PE according to the present exemplary embodiment includes a second slit SLT2 formed in a portion thereof. That is, each of the first and second sub-pixel electrodes PE1 and PE2 includes at least one second slit SLT2 corresponding to each domain. For example, the first and second sub-pixel electrodes PE1 and PE2 have a rectangular shape, and the second slit SLT2 is provided at the end portion of each domain to be substantially in parallel to at least one side of the rectangular shape, or along at least a portion of the end portions of the first and/or second sub-pixels PE1 and PE2. The second slit SLT2 includes a plurality of sub-slits. The sub-slits are adjacent to and extended along the sides of the rectangular shape. When a portion between end portions of the sub-slits adjacent to each other is referred to as a connection portion CN, the connection portion CN is disposed between the domains, i.e., at a center portion of each side of the rectangular shape. However, the arrangement and shape of the first and second slits SLT1 and SLT2 should not be limited thereto or thereby. That is, the first and second slits SLT1 and SLT2 may be arranged in various ways along the end portion of the domains.

The display panel having the above-mentioned structure forms an equipotential surface between the common electrode CE and the first and second sub-pixel electrodes PE1 and PE2, which is substantially in parallel to the upper surface of the substrate. In the display panel, the liquid crystal molecules may be easily pretilted in each domain by the first and second sub-pixel electrodes PE1 and PE2. The first and second sub-pixel electrodes PE1 and PE2 form the electric field in cooperation with the common electrode CE, and thus brightness distribution of the image is uniform because the vertical electric field is not distorted. In addition, because two step motions of the liquid crystal molecules do not exist, a response speed of the liquid crystal molecules may be remarkably improved.

To manufacture the upper substrate SUB1 of the display panel having the above-mentioned structure, the first slit is required to be formed in the common electrode CE. The first slit is formed by a photolithography process using a mask. The first slit may be formed through the same process as the first alignment layer barrier AB1, and thus the first slit has the same depth as the recess portion RCS of the first alignment layer barrier AB1. That is, the first slit is formed by forming the overcoat layer OC and the common electrode CE on the first base substrate BS1, forming the photoresist pattern on the common electrode CE, and etching the common electrode CE and the portion of the overcoat layer OC using the photoresist pattern as the mask. Therefore, the first slit and the first alignment layer barrier AB1 may be substantially simultaneously formed.

According to the present exemplary embodiment, the first alignment layer barrier AB1 of the upper substrate SUB1 may be formed together with the first slit through a single process without additional process or mask.

Although the exemplary embodiments have been described, it is understood that the present invention should not be limited to these exemplary embodiments but various changes and modifications can be made by one ordinary skilled in the art within the spirit and scope of the present disclosure including the following claims.

What is claimed is:

1. A display panel comprising:
   a first substrate that includes a first base substrate, an overcoat layer disposed directly on the base substrate, a common electrode disposed on the overcoat layer, and a first alignment layer disposed on the common electrode;
   a second substrate that includes a second base substrate, a pixel electrode disposed on the second base substrate, and a second alignment layer disposed on the pixel electrode; and
   a liquid crystal layer disposed between the first substrate and the second substrate,
   wherein the first substrate includes a recess portion recessed into the overcoat layer of the first substrate from a surface of the common electrode, a first alignment barrier protruded from the recess portion in an area of the first substrate corresponding to a position of at least a portion of an end portion of the first alignment layer, and the common electrode is not provided on the recess portion.

2. The display panel of claim 1, wherein the first alignment layer barrier comprises a first barrier spaced apart from the first alignment layer and a second barrier overlapped with the first alignment layer, and the end portion of the first alignment layer is interposed between the first barrier and the second barrier.

3. The display panel of claim 2, wherein at least one of the first and second barriers is provided in a plural number.

4. The display panel of claim 3, wherein the first and second barriers are disposed in a non-display area of the display panel outside of a display area of the display panel and at least a portion of each of the first and second barriers is extended along an end portion of the first substrate.

5. The display panel of claim 4, wherein the first alignment layer barrier further comprises a bridge to connect the first barrier and the second barrier.

6. The display panel of claim 1, wherein an upper surface of the first alignment layer barrier is positioned at a same plane as the surface of the common electrode.

7. The display panel of claim 1, wherein the first substrate further comprises an overcoat layer disposed between the first base substrate and the common electrode, and the recess portion is formed by removing a portion of the common electrode and the overcoat layer.

8. The display panel of claim 1, wherein the second substrate further comprises:

a spacer disposed on the second substrate to maintain a distance between the first substrate and the second substrate; and a second alignment layer barrier disposed in a non-display area of the second base substrate and protruded from the second base substrate in an area corresponding to a position of at least a portion of an end portion of the second alignment layer.

9. The display panel of claim 8, wherein the second alignment layer barrier is disposed in an area to align with the area of the recess portion, and is spaced apart from the first alignment layer barrier when viewed in a plan view.

10. The display panel of claim 9, wherein the second alignment layer barrier comprises a same material as the spacer.

11. The display panel of claim 8, wherein the second alignment layer barrier comprises a third barrier spaced apart from the second alignment layer and a fourth barrier overlapped with the second alignment layer, and the end portion of the second alignment layer is interposed between the third barrier and the fourth barrier.

12. The display panel of claim 11, wherein at least one of the third and fourth barriers is provided in a plural number.

13. The display panel of claim 1, further comprising a sealant part disposed along an end portion of the first and second substrates to seal the liquid crystal layer, wherein the sealant part is spaced apart from the first and second alignment layer barriers in a plan view.

14. The display panel of claim 13, wherein the second substrate further comprises:

a line part disposed on the second base substrate and including a common line, a gate line, and a data line; and a switching device electrically connected to the gate line, the data line, and the common electrode, wherein the first substrate further comprises a contact part to connect the common line and the pixel electrode.

15. The display panel of claim 1, wherein the common electrode comprises a trunk portion to define a plurality of domains and a plurality of branch portions extended from the trunk portion and arranged parallel to each other in each domain.

16. The display panel of claim 1, wherein the pixel electrode has a rectangular shape and comprises a first slit provided along at least a portion of an end portion of the pixel electrode when viewed in a plan view, and the common electrode comprises a second slit substantially in parallel to at least one side of the rectangular shape and crossing a center portion of the common electrode.

17. The display panel of claim 16, wherein the second slit is formed by removing a portion of the common electrode and the overcoat layer, and the second slit has a same depth as the recess portion.

* * * * *